July 3, 1962  F. J. SKRIP  3,042,097
TIRE CHAIN
Filed Aug. 17, 1961

INVENTOR.
FRANK J SKRIP
BY
ATTORNEY

United States Patent Office 3,042,097
Patented July 3, 1962

3,042,097
TIRE CHAIN
Frank J. Skrip, 2247 Wilson Ave., Pittsburgh, Pa.
Filed Aug. 17, 1961, Ser. No. 132,059
6 Claims. (Cl. 152—239)

This invention relates to a traction device, and specifically to an improved tire chain that can be mounted on the wheel of a motor vehicle.

In accordance with the prior art of which I am aware, tire chains comprise two runners which are circumferential chains and which form circular rings generally concentic with the axis of the wheel on which they are mounted. These rings of chain lie along both the outside and the inside sidewall of the tire of the wheel. Cross-links are provided which are short lengths of chain that join the two ring chains at intervals. The cross-links cross over the tread of the tire to improve traction. These chains are mounted by joining the ends of the runners or circumferential chains along each sidewall with a clamp which is provided on the end of each ring chain. Joining the ends of the runner or ring chain which is on the inside sidewall of the tire next to the vehicle proper is very difficult, cold, dirty and uncomfortable. It is common practice to drive an automobile into a garage and have it jacked up or raised on a lift in order to free the wheels from surface of the ground and to provide access to the inside of the wheels to a mechanic who moves under the car and joins the inside ring chain. It is frequently not practical to use the facilities of a garage to mount the chain and the job must be done by the driver which is very aggravating to the driver particularly if the driver is a man dressed in good clothes or if the driver is a woman.

A tire chain that would be easy to install or to mount on the tire and that could be mounted without going to the expense of using garage facilities and also could be mounted on a vehicle even after it encountered slippery road surfaces or was stuck and was not able to move itself would constitute an important improvement. Because the outside of the wheel is so much more readily available to a person than the inside of the wheel, and because it is fastening the inside clamp that makes it extremely difficult to mount tire chains, then eliminating the clamp on the inside of the tire would be a great improvement.

It is accordingly an object of my invention to provide an improved tire chain which can be mounted by a person easily from the outside of the wheel.

It is another object of my invention to provide a practical tire chain that has no clamp or closure device that has to be fastened on the inside of the wheel, but instead may be fastened in place from the outside of the wheel.

It is an ancillary object of my invention to provide an improved tire chain which can be mounted by one person without jacking the car to raise the wheels up off the surface of the ground, and which can be fastened to a car which already is on a slippery surface or is mired.

It is another object of my invention to provide an improved article of manufacture.

In accordance with the preferred embodiment of my invention I provide a tire chain constructed in two semicircular sections. The two sections are joined together at each end by bringing lengths of chain from the ends of the inside runners to the outside runners of the opposite sections so as to form an X of chain over the tread of the tire. This allows the chain to be joined entirely on the outside of the tire and by the use of bracing chains I have found that the chain is secure.

The novel features that I consider characteristic of my invention are set forth with particularity in the appended claims. The invention itself, however, both as to its organization and its method of operation, together with additional objects and advantages thereof, will best be understood from the following description when read in connection with the accompanying drawing in which:

Figure 1:
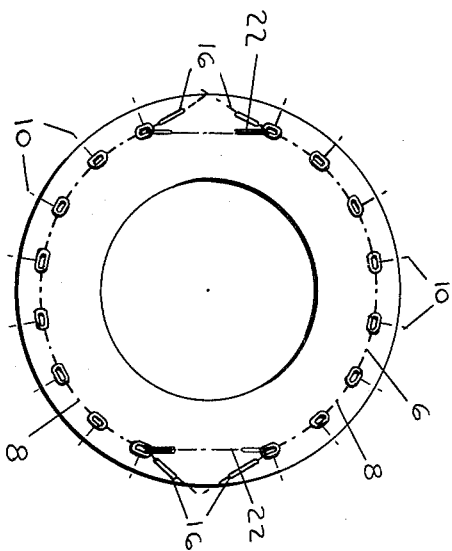
FIGURE 1 is a showing in elevation of a tire and chain as seen from the outside of the wheel in accordance with the preferred embodiment of my invention.
Figure 2:
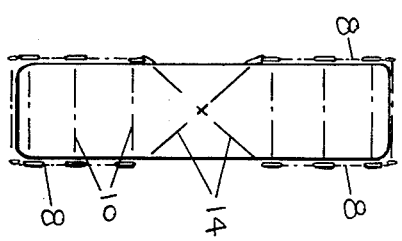
FIGURE 2 is a showing in elevation as seen from the front of the tire showing the crossing of the extended circumferential chains diagonally over the tread of the tire as they are brought to the outside of the wheel.
Figure 4:
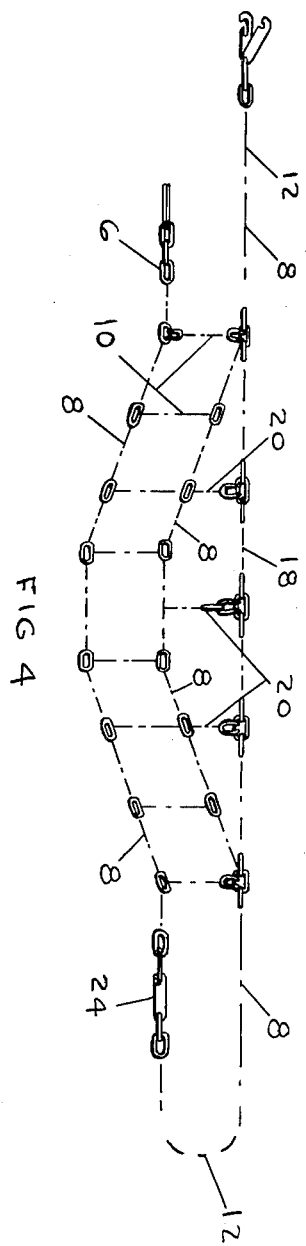
FIGURE 4 is a showing in plan of a half-chain section lying on the ground in a manner preparing to drive a wheel over the chain.
Figure 3:
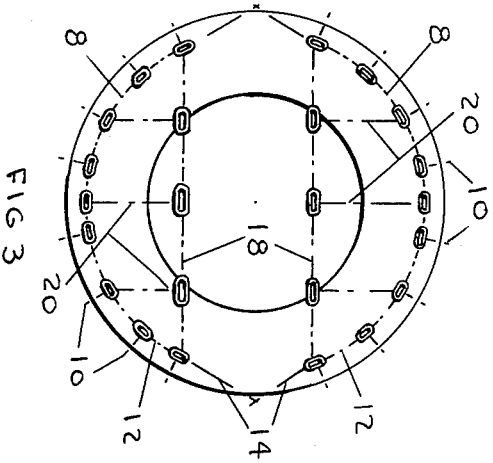
FIGURE 3 is a showing in elevation of the tire and chain mounted on the wheel as viewed from the inside of the wheel.

In accordance with the preferred embodiment of my invention I provide a tire chain comprising two half-chain sections 6. Each section of chain comprises two long lengths of chain which are called the runners or circumferential chains 8 and which are joined at regular intervals by cross-links 10 made of shorter lengths of chain. The cross-links are the chains that improve traction between the tread of the tire and the road surface.

Each half-chain section will surround one-half of the tire of a wheel so that two half-chain sections are used to completely surround the tire of a wheel.

The circumferential chain 8 is in tension when mounted on the tire and its length is less than the peripheral length of the tread of the tire. This prevents the chain from being thrown off the tire. The circumferential chain 8 cannot slide up and across the tread because of its length being less than the peripheral distance around the tread of the tire.

One of the lengths of circumferential chain 12 in each half-chain section is longer than the other. The longer circumferential chain 12 lies along the inside sidewall (closest to the vehicle) when mounted on the wheel. This extra length extends diagonally across the tread of the tire 14 to permit coupling on the outside of the tire 16. The longer inside-circumferential chain 12 is not joined on the inside of the wheel.

In the preferred embodiment of my invention I provide an auxiliary length of chain 18 on the inside of the tire joining the two points of the inside circumferential chain of each half-chain section where the circumferential chain leaves the inside sidewall to pass diagonally across the tread to the outside of the tire. This auxiliary chain 18 establishes a line across the inside of the wheel and prevents the inside circumferential chain from sliding out along or up over the inside sidewall.

In an embodiment of my invention I provide additional lengths of auxiliary restraining chain 20 communicating between the auxiliary chain and the inside circumferential chain between intermediate points along each chain.

In the prior art the inside circumferential chain is joined to itself and the outside circumferential chain is joined to itself. Thus a circle is completed that has a smaller diameter and peripheral distance than that of the tread of the tire.

Eliminating the inside coupling along the inside sidewall and maintaining tension in the crcumferential chains is possible only if the circumferential chains form a circle that is smaller than that of the tread of the tire. This requires that the half-chain sections be joined together to act in tension and in cooperation, each holding the other on the tire.

In order to complete the circle, the inside circumferential chain that is lower than the center of the wheel must be joined to the circumferential chain that is above the center of the wheel, and not to the other inside circumferential chain in order to avoid an inside coupling. Thus, the inside lower circumferential chain is coupled to the outside upper circumferential chain. This coupling 16 being on the outside of the tire requires that the inside circumferential chain be the longer, permitting it to cross the tread, which is not required of the outside circumferential chain. Thus, the circle is completed with one section along the inside sidewall and other section along the outside sidewall of the tire. This is the case for each half-chain section.

In like manner the upper inside circumferential chain crosses the tread to the outside sidewall where it is coupled to the lower outside circumferential chain. This provides two generally-circular continuous circumferential chains each with part of their length running along the inside sidewall and part along the outside sidewall, crossing the tread to make the transition, and being coupled 16 on the outside of the tire.

The inside circle and the outside circle are not in themselves continuous due to the transition across the tread. The interrupted inside circumferential chain is insured against enlarging its circle both by the diagonal direction across the tread 14 of the transition and also by the tension of the auxiliary chain 18 joined to the inside circumferential chain and extending across the inside of the wheel.

The interrupted outside circumferential chain is provided with an additional length of chain and coupling 22 whereby the upper and lower sections of the outside circumferential chain are joined forming a continuous circular circumferential chain lying along the outside sidewall.

An operator can mount the chain on a tire by driving over one half-chain section that is stretched out flat on the ground. When the tire is positioned on the cross links properly the operator slides a half-chain section over the top of the tire.

Mounting is made easier if the longer inside circumferential chains are all first coupled to the outer circumferential chains each at the same end of of the same half-chain section 24. The auxiliary chain sections 18 are on the inside of the tire.

At this point the upper half-chain section is draped in position on the tire. The coupling of the circumferential chains at each end of the half-chain sections 24 means that the operator does not have to reach around the tire to the inside in order to grasp the inside circumferential chains. The upper inside circumferential chain lies across the tread and is coupled to the outside circumferential chain at each end of the upper half-chain section, the coupling lying on the outside sidewall in convenient position.

The operator simply lifts up the lower half-chain section, uncouples the inside circumferential from the upper half-chain section, swings the free end of the upper inside circumferential chain to couple it to the outside circumferential chain of the lower half-chain section. He then uncouples the lower inside circumferential chain and swings its free end up and couples it to the free end of the outside circumferential chain of the upper half-chain section. The extra chain is coupled joining the outside circumferential chain of the two half-chain sections.

The above sequence is repeated for the other proximate ends of the two half-chain sections, completing the mounting.

In another embodiment of my invention I provide a clip to which the extension of the chains of the upper half-chain can be fastened and then clipped to the rim at the lower part of the tire. This avoids having to drive onto a chain when mounting these chains. The operator can then engage the engine of his motor vehicle and turn the wheel so that the mounted half-chain section is brought around to the bottom of the wheel. He can mount the other half-chain section over the top of the tire and fasten the two sections of chain as described previously. Even if the vehicle cannot be moved, the wheel can be rotated by engaging the engine permitting easy mounting even after a vehicle is stuck in mud, or snow, or stalled on ice.

In another embodiment of my invention I provide additional strengthening chains that pass across the wheel of the vehicle to prevent the chains from being thrown off the vehicle during acceleration, or braking, or side thrusts on the wheel.

Although I have shown and described specific embodiments of my invention I am aware that other modifications thereof are possible; my invention, therefore, is not to be restricted except insofar as is necessitated by the prior art and the spirit of the invention.

I claim as my invention:

1. In combination, a tire having inside and outside sidewall sections and a tread section, two sections of chain, each comprising two lengths of peripheral chain sufficient in length to extend more than one-half way around the periphery of said tire, one length of chain of each section being longer than the other, the longer chain lying along said inside sidewall, said sections of chain having the two lengths of chain joined with cross links, said cross links being shorter lengths of chain that cross over the tread of the tire, each of said sections of chain being used with an identical section of chain to substantially surround said tire and being fastened onto said tire by the extended length of the longest chain of one section that diagonally crosses said tread of said tire to the outside sidewall of said tire where it is joined to the outside peripheral chain of said other section.

2. In combination, a wheel and tire on a vehicle, a traction chain comprising two similar sections, each of said sections comprising a pair of circumferential support chains that lie roughly concentric with said wheel along the sidewall of said tire when in place, cross links comprising shorter lengths of chain that lie across the tread of said tire connecting the circumferential chain pair at intervals, the portion of circumferential chain extending beyond the central cross-linked portion of each section of chain extending from the inside sidewall of said tire diagonally across the tread of said tire to join the circumferential chain of the other similar section on the outside sidewall of said tire, the adjacent free ends of each outside circumferential chain lying around the outside sidewall of said tire being brought together and joined providing a safety chain joining the outside circumferential support chain of each section on the outside of the wheel to the outside circumferential support chain of the other section on the outside of the wheel nearest thereto.

3. A traction device for a wheeled vehicle comprising two similar sections, each section comprising two lengths of flexible cable paired and joined together at intervals by cross links comprising shorter lengths of flexible cable that lie across the tread of said tire, said paired cables being separated sufficiently by the length of the cross-links to lie along the sidewalls of said tire roughly concentric with said tire, and that cable of said pair that is along the inside sidewall, toward said vehicle, being extended in length to permit it to cross the tread of said tire and be fastened to that cable of the other section that is lying along the outside sidewall of said tire, and that cable of each section that is lying along the outside sidewall being joined with an extended length of cable of the pair from the other section that also is lying along the outside sidewall of said tire.

4. A traction chain for a wheeled vehicle tire comprising two half-chain sections, each of said half-chain sections comprising two circumferential support chains joined with cross links lying across the tread of said tire therebetween, whereby one circumferential support chain lies along the inside sidewall and the other circumferential support chain lies along the outside sidewall of said tire, a fastening chain comprising an extension in length of the inside circumferential support chain which is brought across the tread of said tire and coupled to the termination of the outside circumferential support chain of the complementary half-chain section on the outside of the wheel, an additional safety chain extending from the termination of the outside circumferential support chain of one half-chain section on the outside of the wheel to the termination of the outside circumferential support chain of the complementary half-chain section on the outside of the wheel nearest thereto.

5. A tire chain comprising two half-chain sections, each half-chain section having two circumferential chains, one lying along the inside sidewall and the other along the outside sidewall of the tire, and having short lengths of chain called cross-links crossing over the tread of the tire and joining the circumferential chains, the extended ends of the circumferential chain of each half-chain section that lies along the inside sidewall being brought across the tread of the tire and coupled to its opposed outside circumferential chain on the outside of the tire.

6. In combination: an automobile wheel and tire, two parallel semicircular half-chains, each half-chain comprising two parallel chains, that chain lying along the inside sidewall extending more than one-half way around the periphery of said automobile wheel, cross-links joining the said two parallel chains of each half-chain, said cross-links crossing over the tread of the tire, and metal rings attached to each parallel chain at the junction with the first and last cross-link, each of said semi-circular half-chains cooperating with a similar semi-circular half-chain to completely surround said automobile wheel and being fastened onto said wheel by the extended length of the inside parallel chains which are threaded through the metal rings provided on the near end of the opposite half-chain and the extended chain drawn across the tread of the tire to the outside of the wheel where it is then joined to the end of the outside chain of its half-chain section.

References Cited in the file of this patent
UNITED STATES PATENTS

| | | |
|---|---|---|
| 1,758,944 | Grosch | May 20, 1930 |
| 1,777,773 | Sjodin | Oct. 7, 1930 |
| 2,436,709 | Bozenhard et al. | Feb. 24, 1948 |
| 2,537,392 | Bettcher | Jan. 9, 1951 |